B. SUER.
AX HANDLE PROTECTOR.
APPLICATION FILED FEB. 19, 1917.
1,259,161.
Patented Mar. 12, 1918.
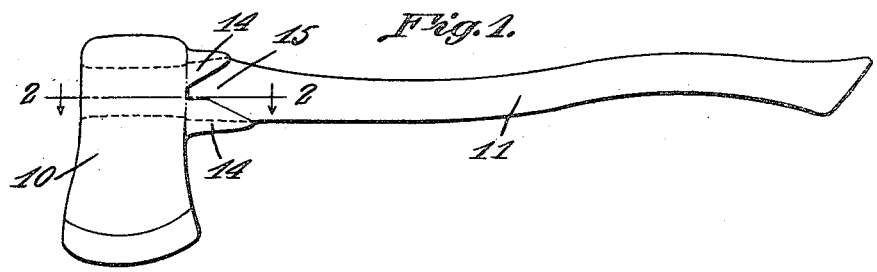
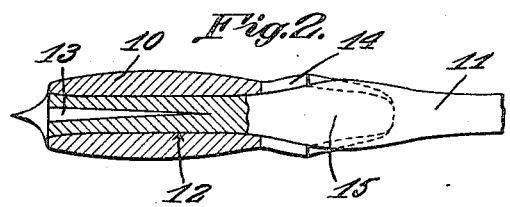
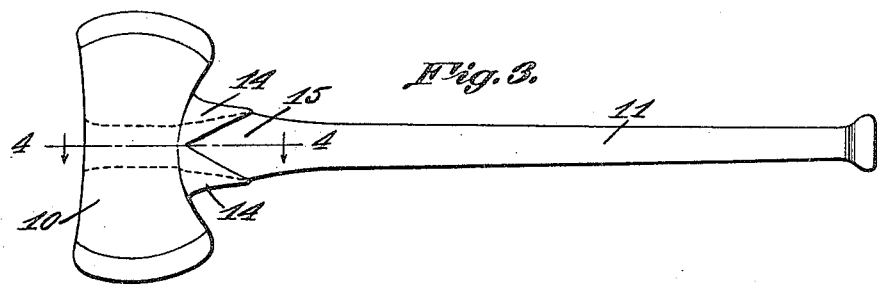
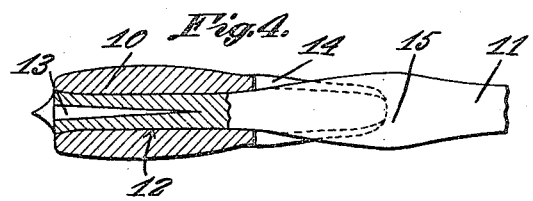
Benjamin Suer INVENTOR
WITNESSES
BY
ATTORNEY

UNITED STATES PATENT OFFICE.

BENJAMIN SUER, OF LANCASTER, WISCONSIN.

AX-HANDLE PROTECTOR.

1,259,161.

Specification of Letters Patent.　　Patented Mar. 12, 1918.

Application filed February 19, 1917.　Serial No. 149,594.

*To all whom it may concern:*

Be it known that I, BENJAMIN SUER, a citizen of the United States, residing at Lancaster, in the county of Grant and State of Wisconsin, have invented certain new and useful Improvements in Ax-Handle Protectors, of which the following is a specification.

This invention relates to an improved handle protector for use in connection with a tool such as an ax and the principal object of the invention is to provide a protector so constructed that the handle may be reinforced at its weakest point and prevent the handle being broken when the implement is in use.

Another object of the invention is to so construct this protector that it will receive a handle of the standard construction, it not being necessary to reduce the handle where usually thickened in order to insert the handle in the cutting head.

In the accompanying drawing, the device is shown as applied to an ax but it is to be understood that this protector can be formed in connection with any suitable implement in which a head is mounted upon a handle.

The invention is illustrated in the accompanying drawings, wherein:—

Figure 1 is a view showing an ax and handle in side elevation, the ax head being provided with the improved protecting device.

Fig. 2 is a sectional view taken along the line 2—2 of Fig. 1.

Fig. 3 is a view in side elevation showing a double ended ax head provided with the improved protector.

Fig. 4 is a fragmentary sectional view taken along the line 4—4 of Fig. 3.

The implement shown in the drawing is provided with a head 10 which may be either of the single or double ended type as shown in Fig. 1 and in Fig. 3. As previously stated this could be an ax head as shown or could be any other implement of a like nature in which there is provided a head mounted upon a handle 11. This head is provided with a socket 12 to receive the handle 11, the handle being secured in the socket by means of a wedge or other fastener 13. Guards 14 extend from the head 10 and may either terminate in slightly spaced relation as shown in Fig. 1 or may connect adjacent the head as shown in Fig. 3. An essential feature is that the inner faces of the guard arms are to be sloped thus providing a tapering face between the guard so that a handle thickened as shown at 15 may be used without it being necessary to reduce the handle thus weakening the handle. There have been guards provided somewhat similar to the guards disclosed but in the guards now in use, it is necessary to either reduce the handle or use a handle of an even thickness throughout its length or else the guards are formed separate from the head and thus liable to slip loose. With this structure, the guards are formed integral with the head and as it is not necessary to reduce the handle, the handle will be thickened and braced at its weakest point and will be protected from damage when in use. It will thus be seen that a very efficient protector has been provided for implements of the character disclosed.

What I claim is:—

An implement of the character described comprising a head having a socket formed therein, guard arms extending about the upper and lower sides of said socket and having sloping inner faces providing an outwardly flared extension for the socket, and a handle fitting into the socket of said head and having a thickened and tapered portion positioned between and engaged by the guard arms.

In testimony whereof I affix my signature in presence of two witnesses.

BENJAMIN SUER.

Witnesses:
J. D. BELLOWS,
CHAS. M. KLARMAN.

Copies of this patent may be obtained for five cents each, by addressing the "Commissioner of Patents, Washington, D. C."